US012146361B2

(12) United States Patent
Prengel et al.

(10) Patent No.: US 12,146,361 B2
(45) Date of Patent: Nov. 19, 2024

(54) POWER DOORS FOR MOTOR VEHICLE WITH HOLD OPEN AND SLEEP CONTROL SYSTEMS AND METHOD

(71) Applicant: MAGNA CLOSURES INC., Newmarket (CA)

(72) Inventors: Sebastian Prengel, Newmarket (CA); Martin Dannemann, Newmarket (CA); Roman Paerschke, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 145 days.

(21) Appl. No.: 17/900,979

(22) Filed: Sep. 1, 2022

(65) Prior Publication Data

US 2023/0067062 A1 Mar. 2, 2023

Related U.S. Application Data

(60) Provisional application No. 63/240,002, filed on Sep. 2, 2021.

(51) Int. Cl.
*E05F 15/611* (2015.01)
*E05F 15/40* (2015.01)
*E05F 15/79* (2015.01)

(52) U.S. Cl.
CPC ............ *E05F 15/611* (2015.01); *E05F 15/79* (2015.01); *E05F 15/40* (2015.01); (Continued)

(58) Field of Classification Search
CPC ......... E05F 15/611; E05F 15/79; E05F 15/40; E05F 15/76; E05F 2015/763; E05F 2015/765; E05F 15/73; E05F 15/70; E05Y 2201/408; E05Y 2201/418; E05Y 2201/434; E05Y 2201/71; E05Y 2400/302; E05Y 2400/356; E05Y 2400/36; E05Y 2400/40; E05Y 2400/44; E05Y 2400/54; E05Y 2800/102; E05Y 2900/531; E05Y 2201/43; E05Y 2400/452; E05Y 2600/46
(Continued)

(56) References Cited

U.S. PATENT DOCUMENTS 7,607,963 B2 * 10/2009 Ishihara .................. E05F 15/40 318/264
7,686,378 B2 * 3/2010 Gisler ..................... E05F 15/43 296/146.4
(Continued)

FOREIGN PATENT DOCUMENTS

WO 2014043780 A1 3/2014
WO 2020252601 A1 12/2020
WO 2021081664 A1 5/2021

*Primary Examiner* — David Luo
(74) *Attorney, Agent, or Firm* — Dickinson Wright PLLC

(57) ABSTRACT

A system and method for controlling motion of a door are provided. The door is moveable between an open position and a closed position and has a balanced position whereat the door does not move towards the open position nor the closed position under an effect of gravity. The system includes a power actuator for moving the door to a partially open position between the open position and the closed position. The power actuator is adapted to allow the door to move to the balanced position after the power actuator has moved the door to the partially open position.

18 Claims, 10 Drawing Sheets

(52) U.S. Cl.
CPC ... *E05Y 2201/408* (2013.01); *E05Y 2201/418* (2013.01); *E05Y 2201/434* (2013.01); *E05Y 2201/71* (2013.01); *E05Y 2400/302* (2013.01); *E05Y 2400/356* (2013.01); *E05Y 2400/36* (2013.01); *E05Y 2400/40* (2013.01); *E05Y 2400/44* (2013.01); *E05Y 2400/54* (2013.01); *E05Y 2800/102* (2013.01); *E05Y 2900/531* (2013.01)

(58) Field of Classification Search
USPC ........................................................ 318/53, 34
See application file for complete search history.

(56) References Cited

U.S. PATENT DOCUMENTS

| | | | | |
|---|---|---|---|---|
| 7,726,722 | B2 * | 6/2010 | Ray | E05F 15/70 296/146.4 |
| 10,392,849 | B2 * | 8/2019 | Xiao | E05F 15/611 |
| 10,683,691 | B2 | 6/2020 | Podkopayev | |
| 10,871,019 | B2 | 12/2020 | Scheuring et al. | |
| 10,907,395 | B2 * | 2/2021 | Kishino | B60J 5/10 |
| 2008/0296927 | A1 | 12/2008 | Gisler et al. | |
| 2009/0217596 | A1 | 9/2009 | Neundorf et al. | |
| 2016/0348413 | A1 | 12/2016 | Broadhead et al. | |
| 2017/0247927 | A1 | 8/2017 | Elie et al. | |
| 2017/0247933 | A1 | 8/2017 | Elie et al. | |
| 2018/0238099 | A1 | 8/2018 | Schatz et al. | |
| 2019/0277078 | A1 | 9/2019 | Baruco et al. | |
| 2020/0123830 | A1 | 4/2020 | Scheuring et al. | |
| 2020/0408025 | A1 | 12/2020 | Zeabari et al. | |
| 2022/0025692 | A1 | 1/2022 | Henes et al. | |

* cited by examiner

| Powered movement | Drifting movement |
|---|---|
| Door is slowly driven | Door is only allowed to move at very low speed |
| Defined endposition | Endposition not defined |
| Will try to keep going if it hits an object | Door will try to resist any outside interaction |
| Needs extra power to drive door | Nearly no power draw |

FIG. 7

POWER DOORS FOR MOTOR VEHICLE WITH HOLD OPEN AND SLEEP CONTROL SYSTEMS AND METHOD

CROSS-REFERENCE TO RELATED APPLICATION

This utility application claims the benefit of U.S. Provisional Application No. 63/240,002 filed Sep. 2, 2021, which is incorporated herein by reference in its entirety.

FIELD

The present disclosure relates generally to closure member systems for motor vehicles and, more particularly, to a power closure member actuation system for moving a closure member, such as a vehicle door, relative to a vehicle body between an open position and a closed position.

BACKGROUND

This section provides background information related to the present disclosure which is not necessarily prior art.

Closure members of motor vehicles may be mounted by one or more hinges to the vehicle body. For example, passenger doors may be oriented and attached to the vehicle body by the one or more hinges for swinging movement about a generally vertical pivot axis. In such an arrangement, each door hinge typically includes a door hinge strap connected to the passenger door, a body hinge strap connected to the vehicle body, and a pivot pin arranged to pivotably connect the door hinge strap to the body hinge strap and define the pivot axis. Such swinging passenger doors ("swing doors") have recognized issues such as, for example, when the vehicle is situated on an inclined surface and the swing door either opens too far or swings shut due to the unbalanced weight of the door. To address this issue, most passenger doors have some type of detent or check mechanism integrated into at least one of the door hinges that functions to inhibit uncontrolled swinging movement of the door by positively locating and holding the door in one or more mid-travel positions in addition to a fully-open position. In some high-end vehicles, the door hinge may include an infinite door check mechanism which allows the door to be opened and held in check at any desired open position. One advantage of passenger doors equipped with door hinges having an infinite door check mechanism is that the door can be located and held in any position to avoid contact with adjacent vehicles or structures.

As a further advancement, power closure member actuation systems have been developed. For passenger doors, like those described above, the power closure member system can function to automatically swing the passenger door about its pivot axis between the open and closed positions, to assist the user as he or she moves the passenger door, and/or to pop out or present the passenger door to the user. Typically, power closure member actuation systems include a power-operated device such as, for example, an electric motor and a rotary-to-linear conversion device that are operable for converting the rotary output of the electric motor into translational movement of an extensible member. In many arrangements, the electric motor and the conversion device are mounted to the passenger door and the distal end of the extensible member is fixedly secured to the vehicle body. One example of a power closure member actuation system for a passenger door is shown in commonly-owned International Publication No. WO2013/013313 to Schuering et al. which discloses use of a rotary-to-linear conversion device or power actuator having an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions.

The power actuator may also be used to provide a door check function in which the door is maintained in a partially open position by the power actuator. Using the power actuator to provide such a door check function can eliminate the need for a mechanical brake (e.g., reduces costs) to provide this door check function. However, one drawback is the constant power draw needed to use the power actuator as the brake mechanism. If the door is left in the partially open position for an extended period of time, the battery of the vehicle powering the power actuator may drain completely resulting in the door naturally drifting uncontrolled and slamming into an object or obstacle.

In view of the above, there remains a need to develop alternative power closure member actuation systems which address and overcome limitations and drawbacks associated with known power closure member actuation systems as well as to provide increased convenience and enhanced operational capabilities.

SUMMARY

This section provides a general summary of the present disclosure and is not a comprehensive disclosure of its full scope or all of its features, aspects and objectives.

It is an aspect of the present disclosure to provide a system for controlling motion of a door. The door is moveable between an open position and a closed position and has a balanced position whereat the door does not move towards the open position nor the closed position under an effect of gravity. The system includes a power actuator for moving the door to a partially open position between the open position and the closed position. The power actuator is adapted to allow the door to move to the balanced position after the power actuator has moved the door to the partially open position.

It is a further aspect for the present disclosure to provide a method for controlling motion of a door. The door is moveable between an open position and a closed position and having a balanced position whereat the door does not move towards the open position nor the closed position under an effect of gravity. The method includes the step of controlling a power actuator for moving the door to a partially open position between the open position and the closed position in a normal powered operation mode. The method continues with the step of holding the door in the partially open position. The method also includes the step of allowing the door to move to the balanced position after holding the door in the partially open position.

In another aspect of the disclosure, the method further includes the step of determining the balanced position during the allowing the door to move to the balanced position.

In another aspect of the disclosure, the method also includes the step of determining a speed of the door reaching or approaching zero during the door moving to the balanced position.

In a further aspect of the disclosure, a power actuator for controlling motion of a door, the door moveable between an open position and a closed position and having a balanced position whereat the door does not move towards the open position nor the closed position under an effect of gravity, the power actuator including a drive mechanism operatively coupled to one of the vehicle door and a vehicle body for imparting a motion of the door, a geartrain assembly operatively coupled to the drive mechanism, and an electric motor operatively coupled to the geartrain assembly, wherein the electric motor is adapted to control the motion of the door in a normal powered operation mode to move the door to stopped position between the open position and the closed position, to hold the door in the stopped position in a hold open mode, and to control the motion of the door in a balancing mode to facilitate motion of the door to the balanced position.

In a related aspect, the electric motor may be not be operated during the balancing mode.

In a related aspect, the electric motor is not adapted to respond to an obstacle detection system during the balancing mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a table of snooze behavior choices for the power closure member actuation system according to aspects of the disclosure;

DETAILED DESCRIPTION

In the following description, details are set forth to provide an understanding of the present disclosure. In some instances, certain circuits, structures and techniques have not been described or shown in detail in order not to obscure the disclosure.

In general, at least one example embodiment of a power closure member actuation system or user modifiable system constructed in accordance with the teachings of the present disclosure will now be disclosed. The example embodiment is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

Figure 1:
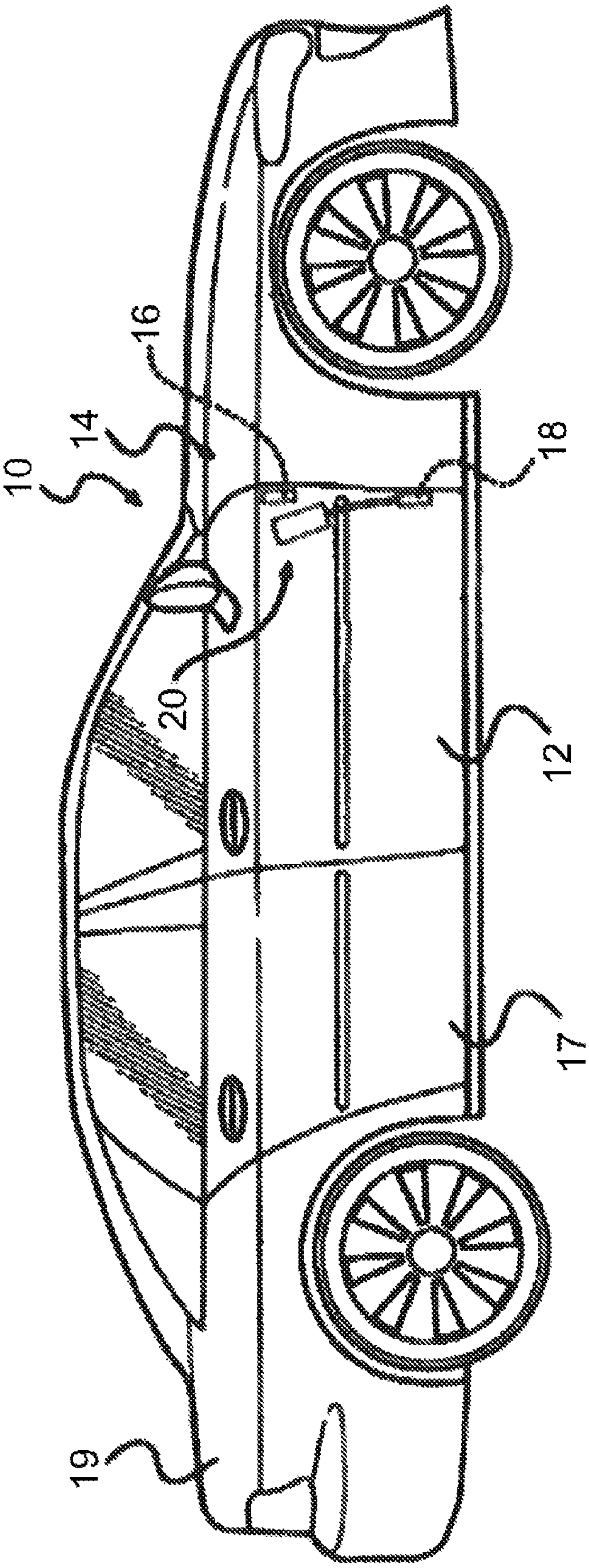
FIG. 1 is a perspective view of an example motor vehicle equipped with a power closure member actuation system situated between the front passenger swing door and the vehicle body according to aspects of the disclosure.

Referring initially to FIG. 1, an example motor vehicle 10 is shown to include a first passenger door 12, or also referred to as an exemplary closure member 12, pivotally mounted to a vehicle body 14 via an upper door hinge 16 and a lower door hinge 18 which are shown in phantom lines. In accordance with the present disclosure, a power closure member actuation system 20 is integrated into the pivotal connection between first passenger door 12 and a vehicle body 14. In accordance with a preferred configuration, power closure member actuation system 20 generally includes a power-operated actuator mechanism or actuator 22 secured within an internal cavity of passenger door 12, and a rotary drive mechanism that is driven by the power-operated actuator mechanism 22 and is drivingly coupled to a hinge component associated with lower door hinge 18. Driven rotation of the rotary drive mechanism causes controlled pivotal movement of passenger door 12 relative to vehicle body 14. Many types of drive mechanisms can be employed, such as a spindle type extensible mechanism, a linear rack and pinion type mechanism, a rotatable linkage mechanism, a cable and drum type mechanism, as but none limiting examples. In accordance with this preferred configuration, the power-operated actuator mechanism 22 is rigidly coupled in close proximity to a door-mounted hinge component of upper door hinge 16 while the rotary drive mechanism is coupled to a vehicle-mounted hinge component of lower door hinge 18. However, those skilled in the art will recognize that alternative packaging configurations for power closure member actuation system 20 are available to accommodate available packaging space. One such alternative packaging configuration may include mounting the power-operated actuator mechanism to vehicle body 14 and drivingly interconnecting the rotary drive mechanism to a door-mounted hinge component associated with one of upper door hinge 16 and lower door hinge 18. One example of an actuator is described in International Patent Application No. WO2021081664A1, the entire contents of which are incorporated herein by reference.

Each of upper door hinge 16 and lower door hinge 18 include a door-mounting hinge component and a body-mounted hinge component that are pivotably interconnected by a hinge pin or post. The door-mounted hinge component is hereinafter referred to a door hinge strap while the body-mounted hinge component is hereinafter referred to as a body hinge strap. While power closure member actuation system 20 is only shown in association with front passenger door 12, those skilled in the art will recognize that the power closure member actuation system can also be associated with any other closure member (e.g., door or liftgate) of vehicle 10, such as rear passenger doors 17 and decklid 19, for example.

Figure 2:
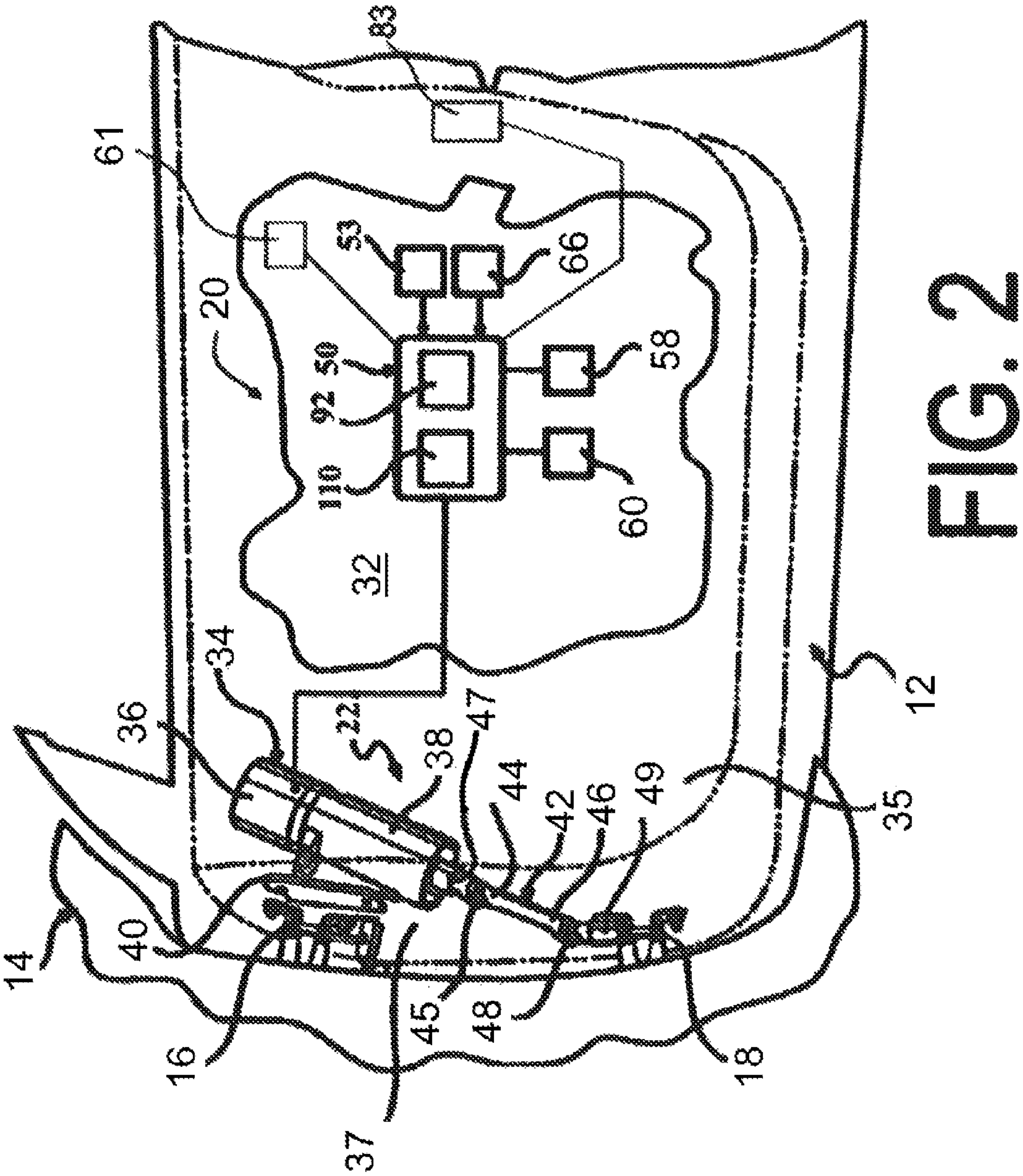
FIG. 2 is a perspective inner side view of a closure member shown in FIG. 1, with various components removed for clarity purposes only, in relation to a portion of the vehicle body and which is equipped with the power closure member actuation system according to aspects of the disclosure.

Power closure member actuation system 20 is generally shown in FIG. 2 and, as mentioned, is operable for controllably pivoting vehicle door 12 relative to vehicle body 14 between an open position and a closed position. The lower hinge 18 of power closure member actuation system 20 includes a door hinge strap connected to vehicle door 12 and a body hinge strap connected to vehicle body 14. Door hinge strap and body hinge strap of lower door hinge 18 are interconnected along a generally vertically-aligned pivot axis via a hinge pin to establish the pivotable interconnection between door hinge strap and body hinge strap. However, any other mechanism or device can be used to establish the pivotable interconnection between door hinge strap and body hinge strap without departing from the scope of the subject disclosure.

As best shown in FIG. 2, the power closure member actuation system 20 includes a power-operated actuator mechanism 22 having a motor and geartrain assembly 34 that is rigidly connectable to vehicle door 12. Motor and geartrain assembly 34 is configured to generate a rotational force. In the preferred embodiment, motor and geartrain assembly 34 includes an electric motor 36 that is operatively coupled to a speed reducing/torque multiplying assembly, such as a high gear ratio planetary gearbox 38. The high gear ratio planetary gearbox 38 may include multiple stages, thus allowing motor and geartrain assembly 34 to generate a rotational force having a high torque output by way of a very low rotational speed of electric motor 36. However, any other arrangement of motor and geartrain assembly 34 can be used to establish the required rotational force without departing from the scope of the subject disclosure.

Motor and geartrain assembly 34 includes a mounting bracket 40 for establishing the connectable relationship with vehicle door 12. Mounting bracket 40 is configured to be connectable to vehicle door 12 adjacent to the door-mounted door hinge strap associated with upper door hinge 16. As further shown in FIG. 2, this mounting of motor assembly 34 adjacent to upper door hinge 16 of vehicle door 12 disposes the power-operated actuator mechanism 22 of power closure member actuation system 20 in close proximity to the pivot axis A. The mounting of motor and geartrain assembly 34 adjacent to upper door hinge 16 of vehicle door 12 minimizes the effect that power closure member actuation system 20 may have on a mass moment of inertia (i.e., pivot axis A) of vehicle door 12, thus improving or easing movement of vehicle door 12 between its open and closed positions. In addition, as also shown in FIG. 2, the mounting of motor and geartrain assembly 34 adjacent to upper door hinge 16 of vehicle door 12 allows power closure member actuation system 20 to be packaged in front of an A-pillar glass run channel 35 associated with vehicle door 12 and thus avoids any interference with a glass window function of vehicle door 12. Put another way, power closure member actuation system 20 can be packaged in a portion 37 of an internal door cavity 39 within vehicle door 12 that is not being used, and therefore reduces or eliminates impingement on existing hardware/mechanisms within vehicle door 12. Although power closure member actuation system 20 is illustrated as being mounted adjacent to upper door hinge 16 of vehicle door 12, power closure member actuation system 20 can, as an alternative, also be mounted elsewhere within vehicle door 12 or even on vehicle body 14 without departing from the scope of the subject disclosure.

Power closure member actuation system 20 further includes a rotary drive mechanism that is rotatively driven by the power-operated actuator mechanism 22. As shown in FIG. 2, the rotary drive mechanism includes a drive shaft 42 interconnected to an output member of gearbox 38 of motor and geartrain assembly 34 and which extends from a first end 44 disposed adjacent gearbox 38 to a second end 46. The rotary output component of motor and geartrain assembly 34 can include a first adapter 47, such as a square female socket or the like, for drivingly interconnecting first end 44 of drive shaft 42 directly to the rotary output of gearbox 38 In addition, although not expressly shown, a disconnect clutch can be disposed between the rotary output of gearbox 38 and first end 44 of drive shaft 42. In one configuration, the clutch would normally be engaged without power (i.e. power-off engagement) and could be selectively energized (i.e. power-on release) to disengage. Put another way, the optional clutch drivingly would couple drive shaft 42 to motor and geartrain assembly 34 without the application of electrical power while the clutch would require the application of electrical power to uncouple drive shaft 42 from driven connection with gearbox 38. As an alternative, the clutch could be configured in a power-on engagement and power-off release arrangement. The clutch may engage and disengage using any suitable type of clutching mechanism such as, for example, a set of sprags, rollers, a wrap-spring, friction plates, or any other suitable mechanism. The clutch is provided to permit door 12 to be manually moved by the user between its open and closed positions relative to vehicle body 14. Such a disconnect clutch could, for example, be located between the output of electric motor 36 and the input to gearbox 38. The location of this optional clutch may be dependent based on, among other things, whether or not gearbox 38 includes "back-driveable" gearing. In one possible configuration, the power-operated actuator mechanism 22 is provided without a clutch mechanism, and so a direct permanent coupling between the motor and output of the power-operated actuator mechanism 22 (e.g. a coupling to the vehicle body 14 for example.) In such a configuration, the geartrain assembly 34 may possibly be a backdriveable geartrain.

Second end 46 of drive shaft 42 is coupled to the body hinge strap of lower door hinge 18 for directly transferring the rotational force from motor and geartrain assembly 34 to door 12 via the body hinge strap portion of lower hinge 18. To accommodate angular motion due to swinging movement of door 12 relative to vehicle body 14, the rotary drive mechanism further includes a first universal joint or U-joint 45 disposed between first adapter 47 and first end 44 of drive shaft 42 and a second universal joint or U-joint 48 disposed between a second adapter 49 and second end 46 of drive shaft 42. Alternatively, constant velocity joints could be used in place of the U-joints 45, 48. The second adapter 49 may also be a square female socket or the like configured for rigid attachment to the body hinge strap of lower door hinge 18. However, other means of establishing the drive attachment can be used without departing from the scope of the disclosure. Rotation of drive shaft 42 via operation of motor and geartrain assembly 34 functions to actuate lower door hinge 18 by rotating the body hinge strap about its pivot axis to which drive shaft 42 is attached and relative to the door hinge strap of the lower hinge 18. As a result, power closure member actuation system 20 is able to effectuate movement of vehicle door 12 between its open and closed positions by "directly" transferring a rotational force directly to body hinge strap of lower door hinge 18. With motor and geartrain assembly 34 connected to vehicle door 12 adjacent to upper door hinge 16, second end 46 of drive shaft 42 is attached to body hinge strap of lower door hinge 18. Based on available space within door cavity 39, it may be possible to mount motor and geartrain assembly 34 adjacent to the door-mounted hinge component of lower door hinge 18 and directly connect second end 46 of drive shaft 42 to the vehicle-mounted hinge component of upper door hinge 16. In the alternative, if motor and geartrain assembly 34 is connected to vehicle body 14, second end 46 of drive shaft 42 would be attached to door hinge strap.

Figure 3:
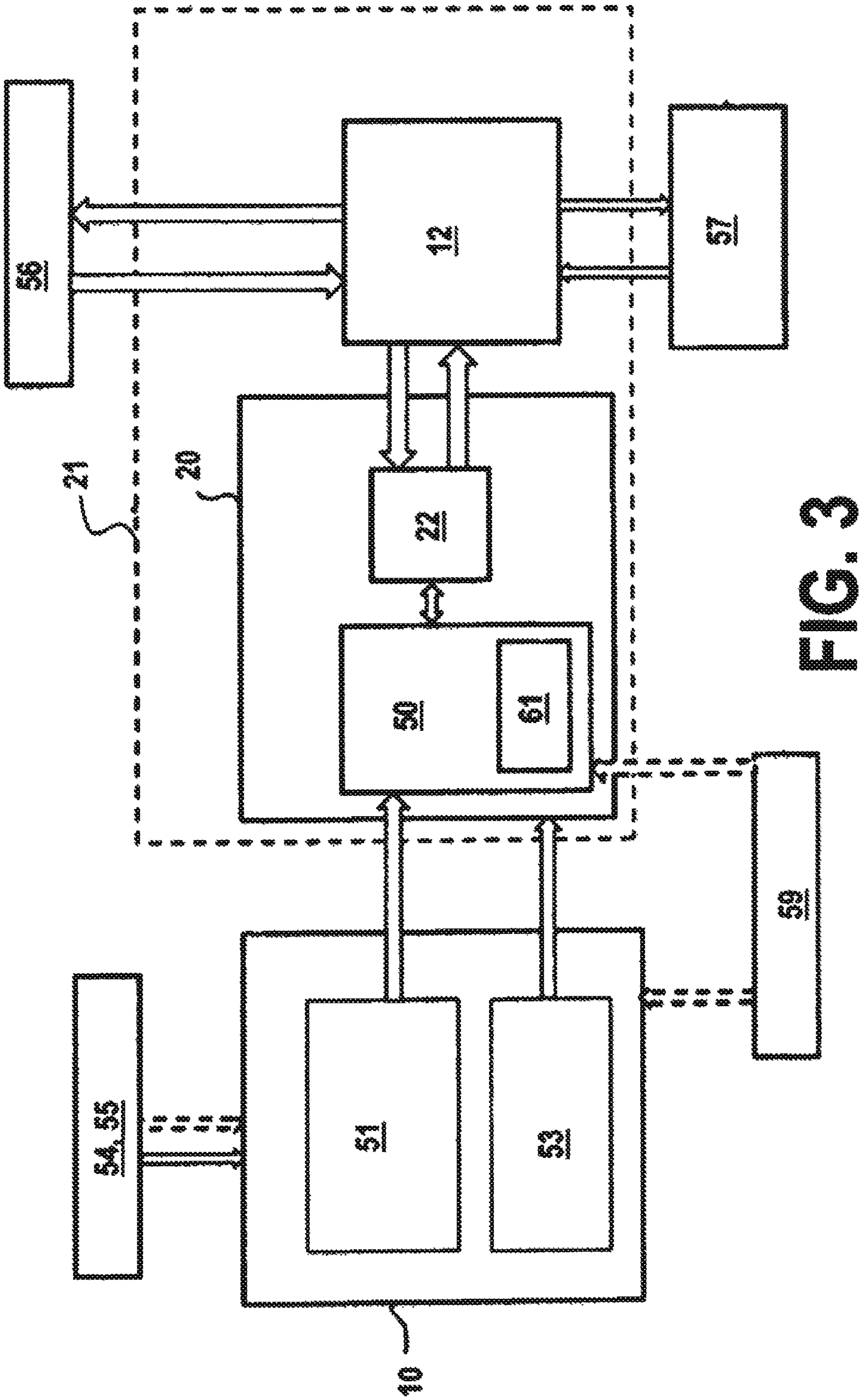
FIG. 3 illustrates a block diagram of the power closure member actuation system according to aspects of the disclosure.

FIG. 3 illustrates a block diagram of the power closure member actuation system 20 of a power door system 21 for moving the closure member (e.g., vehicle door 12) of the vehicle 10 between open and closed positions relative to the vehicle body 14. As discussed above, the power closure member actuation system 20 includes the actuator 22 that is coupled to the closure member (e.g., vehicle door 12) and the vehicle body 14. The actuator 22 is configured to move the closure member 12 relative to the vehicle body 14. The power closure member actuation system 20 also includes a controller 50 that is coupled to the actuator 22 and in communication with other vehicle systems (e.g., a body control module) and also receives vehicle power from the vehicle 10 (e.g., from a vehicle battery 53). Referring back to FIG. 2, the controller 50 is in communication with an ancillary actuator or door presenter 61 for controlling motion of the door and the controller 50 is configured to transition control between the actuator 20 and the ancillary actuator 61. The controller 50 is also in communication with a latch 83 of the door 12 for selectively securing the door 12 to vehicle body 14.

The controller 50 is operable in at least one of an automatic mode (in response to an automatic mode initiation input 54) and a powered assist mode (in response to a motion input 56). In the automatic mode, the controller 50 commands movement of the closure member through a predetermined motion profile (e.g., to open the closure member). The powered assist mode is different than the automatic mode in that the motion input 56 from the user may be continuous to move the closure member, as opposed to a singular input by the user in automatic mode. Commands 51 from the vehicle systems may, for example, include instructions the controller 50 to open the closure member, close the closure member, or stop motion of the closure member. Such control inputs, such as inputs 54, 56 may also include other types of inputs 55, such as an input from a body control module, which may receive a wireless command to control the door opening based on a signal such as a wireless signal received from the key fob 60, or other wireless device such as a cellular smart phone, or from a sensor assembly provided on the vehicle, such as a radar or optical sensor assembly detecting an approach of a user, such as a gesture or gait e.g. walk of the user upon approach of the user to the vehicle. Also shown are other components that may have an impact on the operation of the power closure member actuation system 20, such as door seals 57 of the vehicle door 12, for example. In addition, environmental conditions 59 (rain, cold, heat, etc.) may be monitored by the vehicle 10 (e.g., by the body control module) and/or the controller 50. One example of a controller is described in International Patent Application No. WO2020252601A1, the entire contents of which are incorporated herein by reference. Accordingly, controller 50 may be programmed to control movement of the door 12 in an automatic mode, and/or a powered assist or servo mode.

Figure 4:
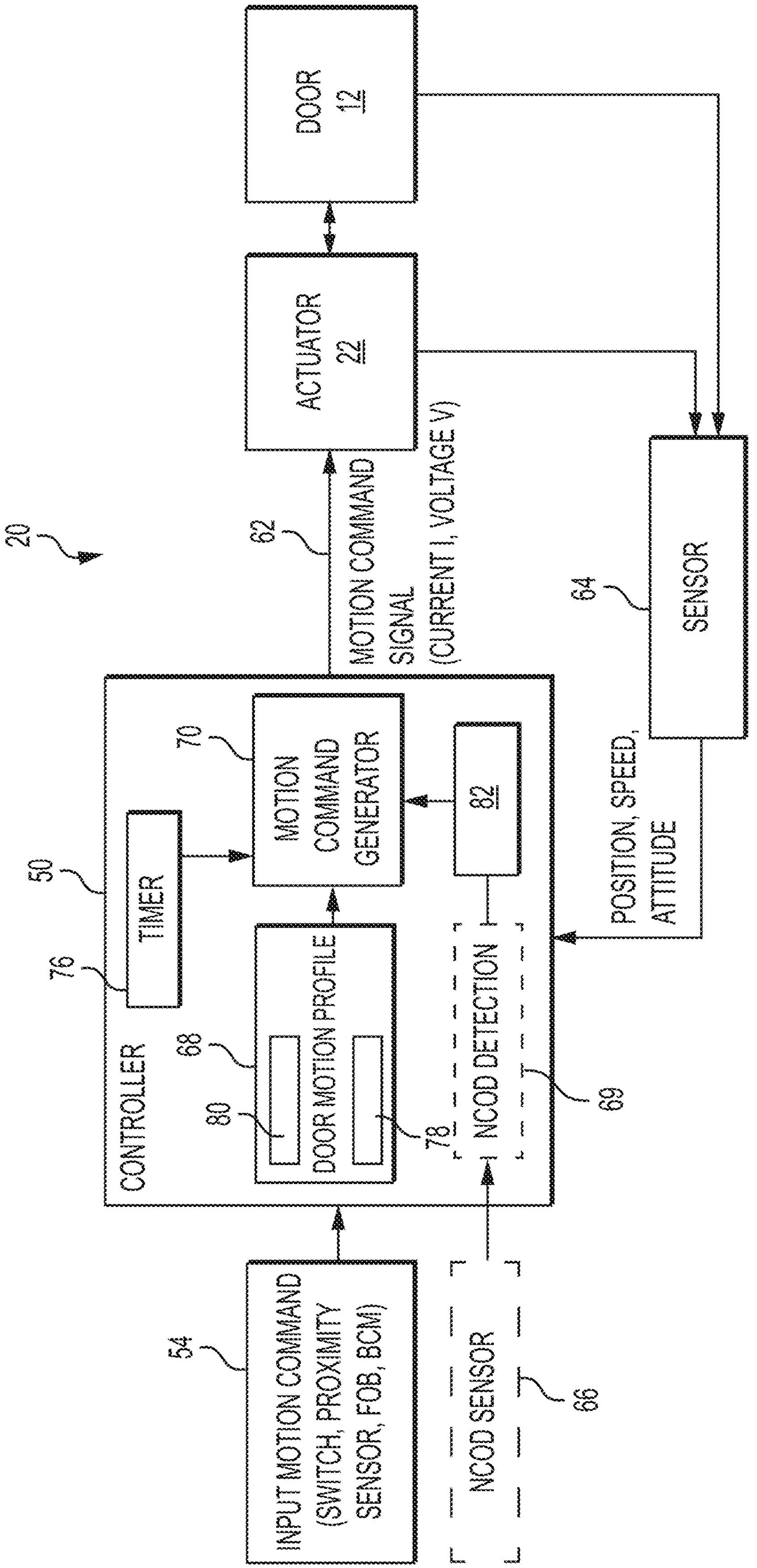
FIG. 4 illustrates another block diagram of the power closure member actuation system for moving the closure member in an automatic mode according to aspects of the disclosure.

Referring now to FIG. 4, the controller 50 is configured to receive the automatic mode initiation input 54 and enter the automatic mode to output a motion command 62 in response to receiving the automatic mode initiation input 54 or input motion command 62. The automatic mode initiation input 54 can be a manual input on the closure member itself (e.g., front passenger door 12) or an indirect input to the vehicle (e.g., closure member switch 58 on the closure member, switch on a key fob 60, etc.). So, the automatic mode initiation input 54 may, for example, be a result of a user or operator operating a switch (e.g., the closure member switch 58), making a gesture near the vehicle 10, or possessing a key fob 60 near the vehicle 10, for example. It should also be appreciated that other automatic mode initiation inputs 54 are contemplated, such as, but not limited to a proximity of the user detected by a proximity sensor.

In addition, the power closure member actuation system 20 includes at least one closure member feedback sensor 64 for determining at least one of a position and a speed and an attitude of the closure member. Thus, the at least one closure member feedback sensor 64 detects signals from either the actuator 22 by counting revolutions of the electric motor 36, absolute position of an extensible member (not shown), or from the door 12 (e.g., an absolute position sensor on a door check as an example) can provide position information to the controller 50. Feedback sensor 64 in communication with controller 50 is illustrative of part of a feedback system or motion sensing system for detecting motion of the door directly or indirectly, such as by detecting changes in speed and position of the closure member, or components coupled thereto. For example, the motion sensing system may be hardware based (e.g. a hall sensor unit an related circuity) for detecting movement of a target on the closure member (e.g. on the hinge) or actuator 22 (e.g. on a motor shaft) as examples, and/or may also be software based (e.g. using code and logic for executing a ripple counting algorithm) executed by the controller 50 for example. Other types of position, speed, and/or orientation detectors such as accelerometers and induction based sensors may be employed without limitation.

The power closure member actuation system 20 additionally includes at least one non-contact obstacle detection sensor 66 which may form part of a non-contact obstacle detection system coupled, such as electrically coupled, to the controller 50. The controller 50 is configured to determine whether an obstacle is detected using the at least one non-contact obstacle detection sensor 66 (e.g., using a non-contact obstacle detection algorithm 69) and may, for example, cease movement of the closure member in response to determining that the obstacle is detected. The non-contact obstacle detection system may also be configured to calculate distance from the closure member to the object or obstacle, or to a user as the object or obstacle, to the door 12. For example non-contact obstacle detection system may be configured to perform time of flight calculations to determine distance using a radar based sensor 66 or to characterize the object as a user or human as compared to an non-human object for example based on determining the reflectivity of the object using a radar based sensor 66 and system. The non-contact obstacle detection system may also be configured determine when an obstacle is detected, for example by detecting reflected waves of the object or obstacle or user of radar transmitted from the obstacle sensor 66. The non-contact obstacle detection system may also be configured determine when an obstacle is not detected, for example by not detecting reflected waves of the object or obstacle or user of radar transmitted from the obstacle sensor 66. The operation and example of the at least one non-contact obstacle detection sensor 66 and system are discussed in U.S. Patent Application No. 2018/0238099, incorporated herein by reference.

In the automatic mode, the controller 50 can include one or more closure member motion profiles 68 that are utilized by the controller 50 when generating the motion command 62 (e.g., using a motion command generator 70 of the controller 50) in view of the obstacle detection by the at least one non-contact obstacle detection sensor 66. So, in the automatic mode, the motion command 62 has a specified motion profile 68 (e.g., acceleration curve, velocity curve, deceleration curve, and finally stops at an open position) and is continually optimized per user feedback (e.g., automatic mode initiation input 54).

Figure 5:
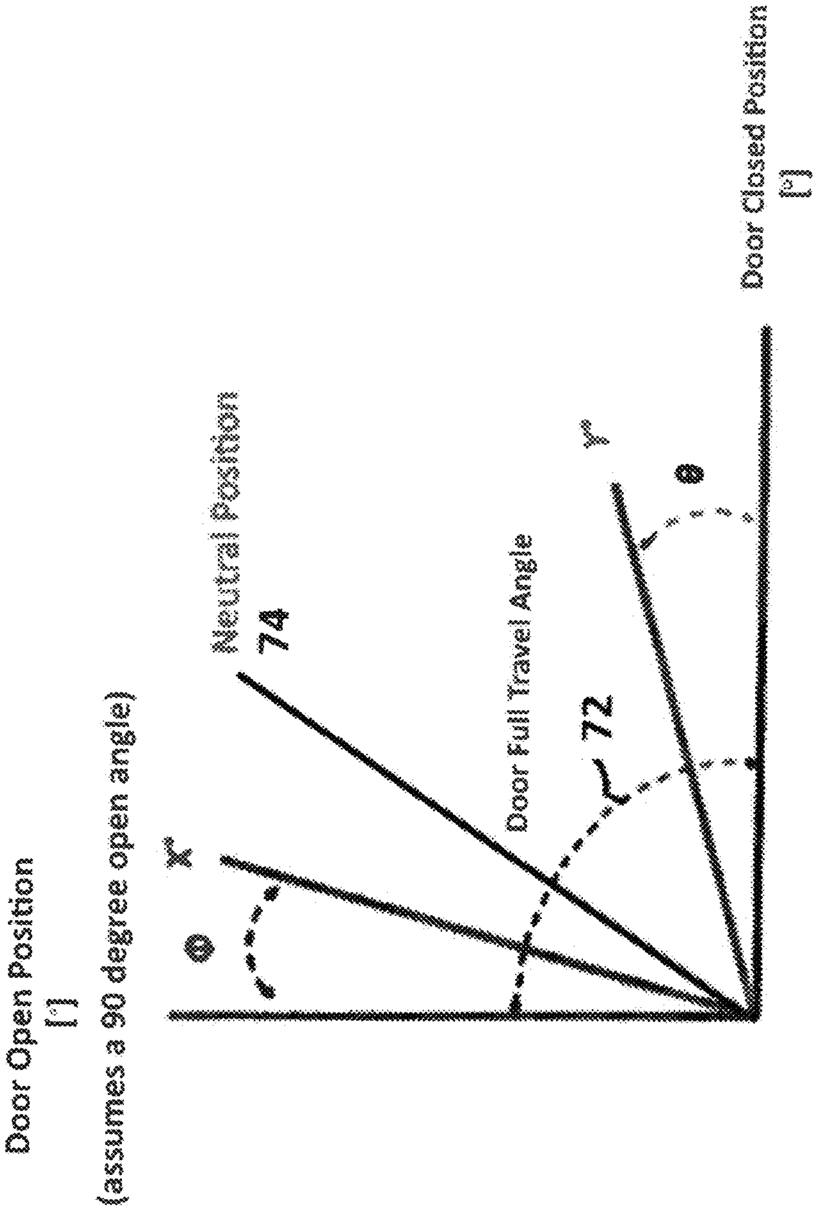
FIG. 5 illustrates a range of movement of the closure member between an open position and a closed position according to aspects of the disclosure.

FIG. 5 illustrates a range of movement of the closure member (e.g., door 12) between the open position and a closed position. While the open position and the closed position are shown as being 90 degrees apart from one another, it should be understood that other configurations and movements of the closure member 12 are contemplated (e.g., the open position and the closed position may be greater than or less than 90 degrees from one another). Based on the position and/or speed of the closure member 12 detected by the at least one closure member feedback sensor 64, the controller 50 can control the actuator 22. The angles X and Y shown in FIG. 5 are example control conditions in the open and close directions respectively and a full travel angle is indicated at 72.

So, using the power closure member actuation system 20, the door 12 may be moved in a powered mode to a partially open position where the door 12 can be held open, possibly using the power from the power actuator 22 to provide the hold open function or maintain the door 12 in the partially open position in a hold open mode.

If the user walks away from the vehicle 10, for example, the user parks the vehicle 10 in a garage and leaves the door 12 half way open, the power actuator 22 may be powered to ensure the door 12 does not move away from this infinite door check position. Using the power actuator 22 to power the door check function eliminates the need for a mechanical brake (e.g., reduces costs) to provide this door check function. However, one drawback is the constant power draw needed to using the power actuator 22 as the brake mechanism. After a period of time, the battery powering the power actuator 22 to maintain the door 12 in the hold open position or infinite door check position can be drained and the power actuator 22 will no longer be powered. Consequently, the door 12 may naturally drift uncontrolled and slam into an object. As a result, the battery will be drained when the user returns and possibly the door 12 may be damaged, since it may swing open uncontrollably depending on the incline of the hinge and/or door 12.

One solution detailed herein and described in more detail below, is to allow the door 12 to move to a neutral position or balanced position 74 after a period of time using the power actuator 22. Again, the power actuator 22 moves the door 12 to the partially open position between the open position and the closed position. Then, according to an aspect, the power actuator 22 is adapted to allow the door 12 to move to the balanced position 74 after the power actuator 22 has moved the door 12 to the partially open position.

Referring back to FIG. 5, such a balanced position 74 is shown, whereat the door 12 does not move towards the open position nor the closed position under an effect of gravity. In other words, the balanced position 74 may be the position at which the door 12 naturally moves to under the force or gravity. The balanced position 74 may be the position at which the door 12 naturally moves to under the force of gravity with additional force assist from the power actuator 22 provided, to assist the door motion towards the balanced position in addition to the force of gravity acting to move the door 12. Resultantly, an increase in the rate of motion compared to motion only imparted by effect of gravity may be provided, or a resistance to the door motion towards the balanced position against the effect of gravity to decrease the rate of motion compared to motion only imparted by gravity may be provided. In a possible configuration, the motor 36, which may include the motor circuitry, such as brake circuitry) of the powered actuator 22 may be configured to resist the motion when electrically activated, and/or the geartrain assembly 34 may be configured to resist the motion, for example due to the forward and/or backdrive characteristics of the geartrain assembly 34. While FIG. 5 shows one example of the balanced position 74, it should be understood that the balanced position 74 may be anywhere in between the opened position (i.e., fully opened position), the closed position (i.e., fully closed position) depending on the angle of the hinges 16, 18 and/or door 12. The balanced position 74 may be closer to the fully open position where the door 12 rests against the end stop. In other cases, the balanced position 74 may be closer to the closed position where it rests against the door seal. The balanced position 74 may be at a partially opened position or be at a detent position of a door check, if provided. So, at the balanced position 74, the door 12 will naturally maintain its position due to gravity and it is not necessary to use the powered actuator 22 to hold the door 12 open.

Referring back to FIG. 4, in order to prevent a damage causing collision during the door motion to balanced position 74, the door 12 may have a controlled motion (e.g., at a slower speed), so that if an obstacle is present and the door 12 strikes the obstacle, such a strike will be at slower speed to prevent damage. Thus, according to an aspect, the controller 50 is adapted to control the power actuator 22 to move the door 12 to the balanced position 74 at an operation rate below a normal rate of operation of the power actuator 22. In addition, the power actuator 22 is adapted to allow the door 12 to move to the balanced position 74 after an expiry of a period of time (e.g., a predetermined snooze period of time or snooze time). In other words, once the door 12 is stopped at the partially open position, a timer 76 is triggered. It is understood the stop position may be a position between the fully opened and closed positions, as well as may include the fully opened and closed position. It is understood the stop position may be predetermined based on a preprogrammed position of the system, or may be an undetermined position realized upon a detected interrupt (e.g. a button press or a physical interaction with the door 12) by the user of the door motion during the normal powered mode for example. Furthermore, the operation rate can be allowed to increase as the door 12 moves away from the partially open position and may also be maintained below a predetermined threshold speed 78 as the door 12 approaches the balanced position 74. A memory unit of the controller 50 stores the predetermined threshold speed 78. The maximum door motion speed variable or the predetermined threshold speed 78 is used during a balanced position homing operation (i.e., to find the balanced position 74, discussed in more detail below). So, the predetermined threshold speed 78 to the balanced position 74 can be predetermined. For example, the predetermined threshold speed 78 can be set to be lower e.g. 40% of normal door motion speed. The predetermined threshold speed 78 can be based on a weight of the door 12 (e.g., the door speed to neutral position can be set lower based on a heavier door).

While many obstacle detection systems typically aim to prevent a strike, since the door 12 is moving slowly when it hits an obstacle it will likely not damage the door 12 and the door 12 will be allowed to rest on the obstacle. Thus, such a position (i.e., resting against the obstacle) is the balanced position 74. If no obstacle is present, the door 12 will be controlled by the controller 50 to move to the position at which point the power actuator 22 will be unpowered, since the door 12 will naturally be held at this balanced position 74. Any obstacle detection system may be deactivated or any signals from an obstacle detection system may be ignored by the controller 50 as the lower rate of motion of the door 12 during the balancing mode may not result in damage when the door 12 is facilitated to move to rest against the obstacle due to the door 12 being moved either under the force of gravity, or the door 12 motion being resisted by controlled activation of actuator 22. Accordingly, the obstacle detection system may be activated or any signals from an obstacle detection system may be considered by the controller 50 during the normal powered mode when the motion of the door 12 is moved by the actuator 22 under power which may cause the door 12 moving at higher rates of speed and inertia during which an impact of the door 12 with the obstacle may result in damage, and thus avoidance of contact may be desired.

The controller 50 may know or store the balanced position 74 and as a result, the memory unit of the controller 50 can store such a predetermined balanced position 80 (e.g., along with the one or more closure member motion profiles 68 that are utilized by the controller 50), as best shown in FIG. 4. So, the controller 50 knows which direction/position to move door 12 to, as well as being configured to move the door 12 at a reduced lower speed in case obstacles are impacted, the door 12 will not be damaged and the door 12 can be rapidly stopped.

Alternatively, the controller 50 may adaptively find the balanced position 74, since the balanced position 74 may shift depending on the grade of a surface on which the vehicle 10 is parked (i.e., a balanced position homing operation). For example, the balanced position 74 may be sensed using an accelerometer to detect the speed of the door 12 during its move to the balanced position 74. Specifically, when no motion of the door 12 is sensed, this indicates the balanced position 74 has been found. So, according to an aspect, the controller 50 is adapted to determine the balanced position 74. Thus, the controller 50 also includes a balanced position determination unit 82, as shown in FIG. 4. Again, the controller 50 is connected to at least one closure member feedback sensor 64. Consequently, the controller 50 can determine when movement of the door 12 is zero or nearly zero to determine the balanced position 74 of the door 12. So, the balanced position determination unit 82 can be used to sense the door 12 coming to rest at the balanced position 74, which may change depending on the inclination angle of the vehicle 10. The balanced position determination unit 82 can additionally or alternatively sense when the current draw to the motor 36 is minimal indicating the balanced position 74. Other sensors/determinations may be used. This dynamic determination of the balanced position 74 is useful for partially open balanced positions which may be affected by the inclination of the vehicle 10.

Figure 6:
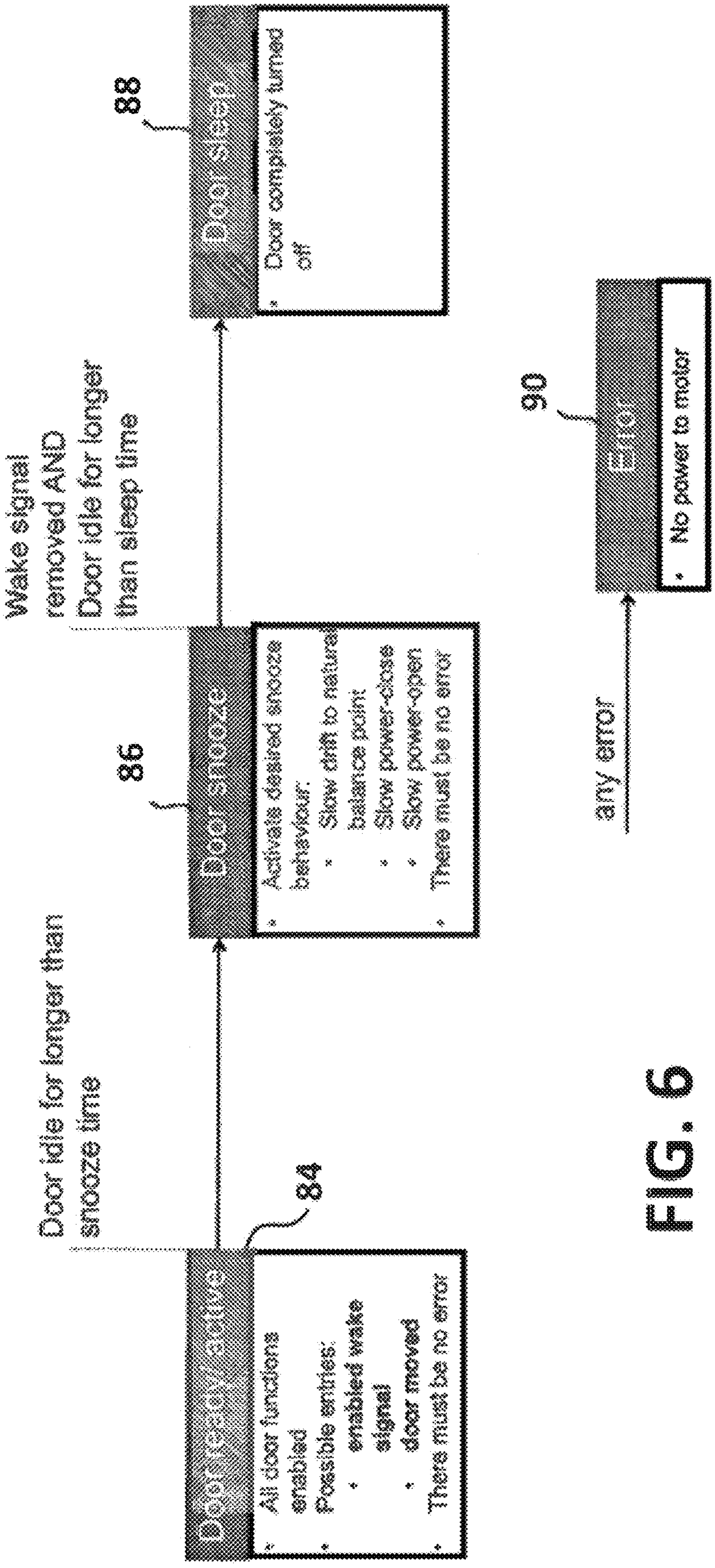
FIG. 6 shows a state diagram for the power closure member actuation system according to aspects of the disclosure.

Referring to FIGS. 6 and 7, as part of the above-described operation including allowing the door 12 to move to the balanced position 74 after the predetermined snooze period of time, the power closure member actuation system 20 (e.g., the controller 50) is operable in one of a door ready/active mode or normal powered operation mode, a door snooze mode or door check mode, a door sleep mode, or an error mode. Specifically, FIG. 6 shows a state diagram for the power closure member actuation system 20. As shown, the door ready/active mode is indicated as numeral 84. In the ready/active mode, all door functions are enabled. Possible entries into the ready/active mode include an enabled wake signal or the door 12 being moved. In addition, to remain in the ready/active mode, there must be no errors. If there is no activity with the door 12 for longer than the predetermined snooze period of time or snooze time, the power closure member actuation system 20 transitions to the door snooze mode, indicated in FIG. 6 as numeral 86. In the door snooze mode, also referred to as a balancing mode, desired snooze behavior discussed herein are activated (e.g., slow drift to balanced position 74, slow power close, slow power open). In addition, the balanced position homing operation may occur during the door snooze mode (e.g., if no predetermined balanced position 80 is being used). Similar to the ready/active mode, to remain in the snooze mode, there must be no errors. If the wake signal is removed and there is no activity with the door 12 for longer than a predetermined sleep period of time or sleep time, the power closure member actuation system 20 transitions to the door sleep mode, indicated as numeral 88. In the door sleep mode, the door 12 (power actuator 22) is completely turned off. In addition, the error mode is indicated as numeral 90. Any error causes the power closure member actuation system 20 to transition to the error mode, and in the error mode, no power is provided to the motor 36 of the power actuator 22.

FIG. 7 is a table of snooze behavior choices for the power closure member actuation system 20. For powered movement of the door 12 during the door snooze mode, the door 12 is driven slowly and there is a defined end position. The controller 50 will continue to cause the power actuator 22 to keep going if it hits an object for powered movement during the door snooze mode (i.e., to allow the door 12 to rest against the object or obstacle as described above). Also for powered movement during the door snooze mode, extra power is needed to drive the door 12. In contrast, for drifting movement of the door 12 during the door snooze mode, the door 12 is only allowed to move at a very low speed and there is no defined end position. The door 12 will try to resist any outside interaction for drifting movement during the door snooze mode. Also for drifting movement during the door snooze mode, nearly no power draw is needed.

So, during the door snooze mode, the controller 50 will control the speed 12 after the predetermined snooze period of time (e.g., determined using the timer 76) and move the door 12 at a less than normal door speed (e.g., below the predetermined threshold speed 78) to the predetermined balanced position 80 or the balanced position 74 determined by the controller 50 (i.e., during the balanced position homing operation). The controller 50 may also be configured to decrease any braking force initially applied to the door 12 (e.g. via motor 36 or brake, discussed in more detail below) as the door 12 drifts to the balanced position 74.

Figure 8:
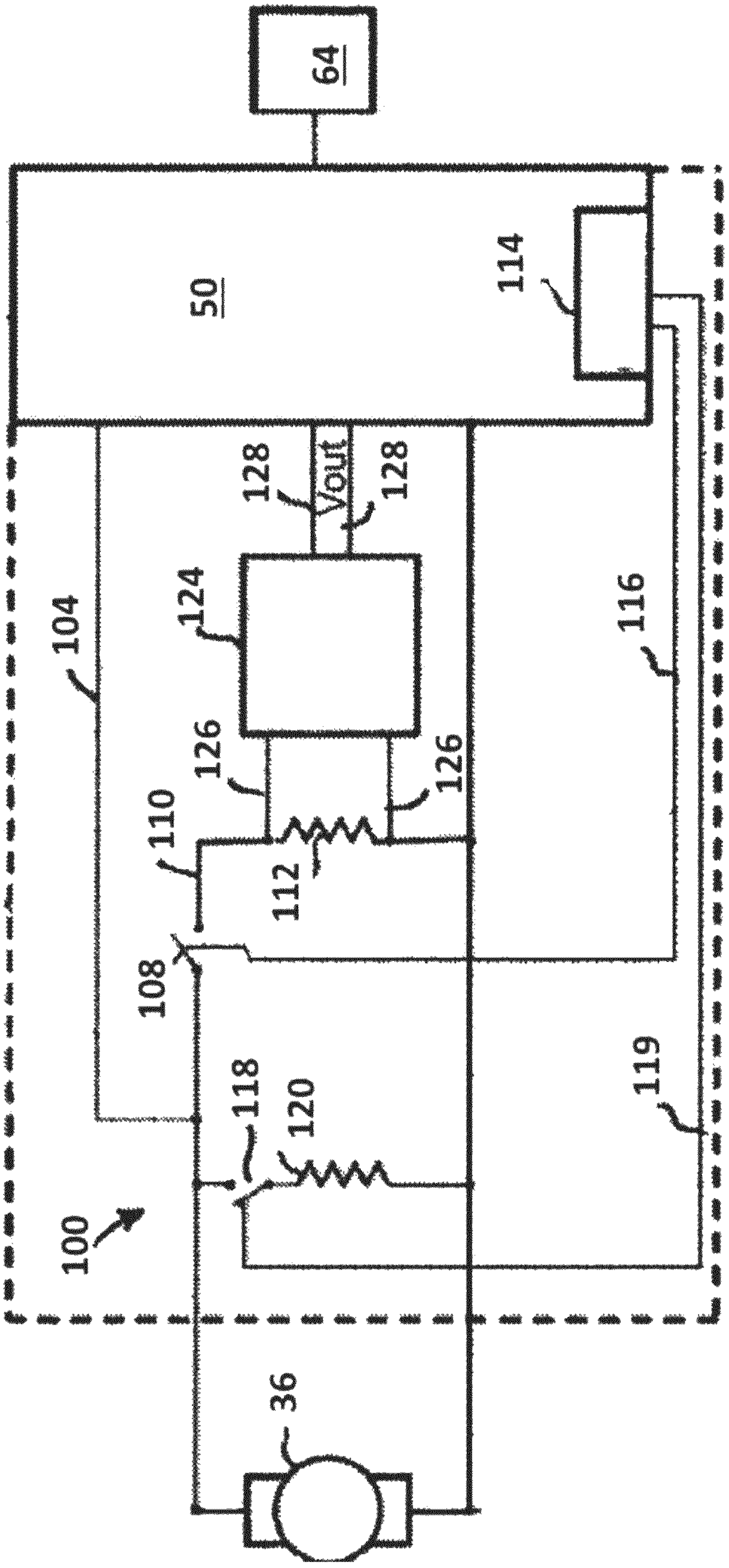
FIG. 8 is an electrical schematic of a braking circuit of the power closure member actuation system according to aspects of the disclosure.

FIG. 8 is an electrical schematic of a braking circuit 100 for the powered power closure member actuation system 20. The braking circuit 100 functions to regulate the speed of the actuator 22 when it is not actively powered by the electric motor 36, such as when the door 12 is moving to its balanced position 74. For example, the braking circuit 100 may be configured to short circuit the electric motor 36 of the power actuator 22 to cause a braking effect. Illustratively shown braking circuit 100 may be provided separate from and controlled by controller 50, or be integrated with controller 50.

As shown in FIG. 8, the braking circuit 100 is controlled by controller 50 to actively drive the electric motor 36 by providing electrical power thereto via a first conductor 104 and a second conductor 106, which may be called a "common" or "neutral" conductor, to cause the electric motor 36 to turn in either the first direction or in the second direction. The first and second directions of the electric motor 36 may correspond to opening and closing the door 12, respectively.

The electric motor 36 generates an induced voltage Vind in response to application of an external force to the actuator 22. This external force may be a result of gravity acting on the door 12, for example.

The braking circuit 100 also includes a first switch 108 operable in a soft braking mode to conduct electrical current from the electric motor 36 through a load to cause the electric motor 36 to apply a first braking force in opposition to the external force. The load may include a first braking resistor 112. The first switch 108 may take the form of a single-pole, single throw (SPST) switch, as shown in FIG. 8. In other embodiments, the first switch 108 may take the form of one or more different devices in a circuit that operate in conjunction to either conduct electrical current through the load or to block electrical current from being conducted through the load. The load may include other devices, such as a rectifier 124 to provide electrical power to one or more devices within the power closure member actuation system 20, such as the controller 50.

In some embodiments, the first switch 108, may be configured to conduct electrical current from the electric motor 36 through the load with the power closure member actuation system 20 in the door snooze mode in which the electric motor 36 is not actively driven by the controller 50. The first switch 108 may also be operable in an non-braking condition to inhibit the flow of electrical current from the electric motor 36 through the load with the power closure member actuation system 20 in the door ready/active mode in which the electric motor 36 may be actively driven by the controller 50. The first switch 108 provides electrical continuity to allow electrical current to flow between the first conductor 104 and a third conductor 110 to conduct electrical current from the electric motor 36 to the load in a soft braking mode. In other words, the first switch 108 is in a conductive condition in the soft braking mode and is configured to inhibit the flow of electrical current from the electric motor 36 to the load when it is not in the soft braking mode.

The first braking resistor 112 is connected between the third conductor 110 and the second conductor 106 to provide a path for electrical current generated by the electric motor 36 as a result of the induced voltage Vind electric motor 36 being rotated by the external force applied to the actuator 22. The first braking resistor 112 may, dissipate power in the form of heat to cause the electric motor 36 to apply a first braking force in opposition to the external force applied to the actuator 22. In other words, the first switch 108 functions to connect the first braking resistor 112 across the electric motor 36 to provide the first braking force. The first braking force may be minimal, and may be merely a byproduct of the main purpose of connecting the first braking resistor 112 across the electric motor 36, which is to generate electrical power, allowing a braking controller 114 to function. Alternatively, or additionally, the first braking force may be non-minimal, and may serve to reduce the speed of the electric motor 36, and the door 12.

According to an aspect, the first switch 108 may default to the soft braking mode while the power closure member actuation system 20 is in the door snooze mode. The first switch 108 may also be placed into the soft braking mode anytime that the electric motor 36 is not actively moving, as determined by controller 50. For example, after controller 50 has determined the door 12 has reached a commanded position, such as fully opened or fully closed, or as another example when controller 50 determines an object is present in the path of the door 12, and controller 50 commands the motor 36 to stop to cease the motion of the door 12. Alternatively, the first switch 108 may be manually operated in the soft braking mode in response to the power closure member actuation system 20 being in the door sleep mode, in which the actuator 22 is completely turned off. In other words, when the electric motor 36 is being actively driven, the first braking resistor 112 may be electrically isolated from the electric motor 36 by the first switch 108 to ensure that power to the electric motor 36 is not transmitted to the first braking resistor 112. The first braking resistor 112 may be re-connected by closing the first switch 108 when that the electric motor 36 is not being actively driven. This may allow the first braking resistor 112 to provide braking, even after the electric motor 36 initiates motion.

As also shown in FIG. 8, the controller 50 includes the braking controller 114 which is configured to monitor the speed of the garage door and to selectively command a second switch 118, which may be called a "hard brake switch," to conduct the electrical current from the electric motor 36 through a second braking resistor 120 to cause the electric motor 36 to apply a second braking force in opposition to the external force. Illustratively, second switch 118 may be selectively controlled using a second control line 119 connected to braking controller 114. Similarly, illustratively first switch 108 may be selectively controlled using a first control line 116 connected to braking controller 114. In some embodiments, the second braking resistor 120 may have a significantly lower resistance than the first braking resistor 112 and may, therefore, cause the second braking force to be significantly greater than the first braking force. It should be appreciated that the second braking resistor 120 may have a higher or lower value or a value that varies depending on the amount of braking required for a particular condition. In some embodiments, the second braking force may be substantially larger than the first braking force.

The braking controller 114 may include any combination of hardware and/or software. In some embodiments, the controller 50 may include the braking controller 114. For example, the braking controller 114 may be a part of the controller 50 as shown in the schematic of FIG. 8, as a separate unit for example as a separate microchip mounted on a common printed circuit board, or may for example be integrated into controller 50. In some embodiments, the braking controller 114 may be a software module running on a processor of the controller 50. Alternatively, the braking controller 114 may be separate and independent from the controller 50.

The second switch 118 may take the form of a single-pole, single throw (SPST) switch, as shown in FIG. 8. In other embodiments, the second switch 118 may take the form of one or more different devices in a circuit that operate in conjunction to either conduct electrical current through the second braking resistor 120 or to block electrical current from being conducted through the second braking resistor 120.

The switches 108, 118 may be manually or automatically operated, and may be relays, or include one or more transistors, such as FETs or BJTs. The switches 108, 118 may be similar or different from one other.

As also shown in FIG. 8, the braking circuit 100 includes a rectifier 124. Input conductors 126 connected to each side of the first braking resistor 112 are charged with the induced voltage Vind and conduct an alternating current to transfer electrical power to the rectifier 124. The rectifier 124 functions to generate a direct current output voltage Vout upon output conductors 128, providing power to the controller 50. In other words, the rectifier 124 may convert alternating current and/or direct current having a positive or negative polarity from the input conductors 126 to a direct current output voltage Vout upon output conductors 128, in a form required by the controller 50, and/or for example by the brake controller 114. The rectifier 124 may include one or more diodes to provide the direct current output voltage Vout that meets the requirements of the controller 50, such as voltage, tolerable ripple, etc. The rectifier 124 may also include one or more other components such as, for example, resistors, capacitors, inductors, or voltage regulators.

According to a further aspect, application of the resistive load can also be varied based on position of the door 12. This may be accomplished by having two or more of the second braking resistors 120, each independently switchable by a corresponding second switch 118. Alternatively, or additionally, the braking controller 114 may vary the application of the second braking resistor 120, for example, by rapidly switching the second switch 118. This may be accomplished, for example, by pulse width modulation (PWM). So, the second switch 118 can be PWM to increase/decrease braking effect (e.g., reduce braking effect as velocity of door 12 tends to zero). At some positions the speed of the door 12 could be very critical to either protecting the function of the door 12, the electric motor 36, and/or other parts of the power closure member actuation system 20. As shown, the at least one closure member feedback sensor 64 is in communication with the controller 50 and is used to sense the motion, speed, and position of the door 12 used in controlling the braking circuit 100.

Figure 9:
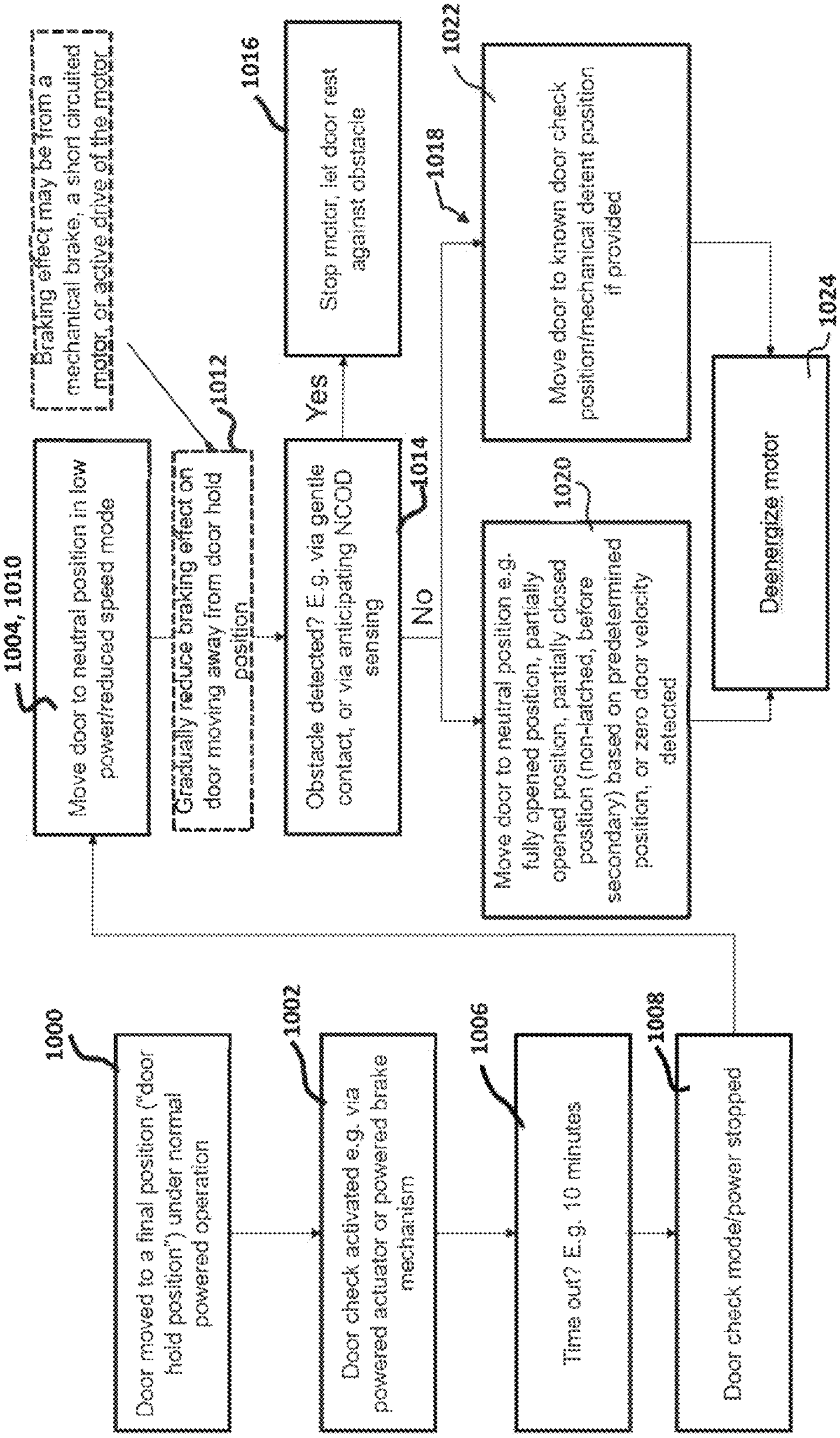
FIG. 9 illustrates steps of the method for controlling motion of the door to the balanced position using powered motion according to aspects of the disclosure.
Figure 10:
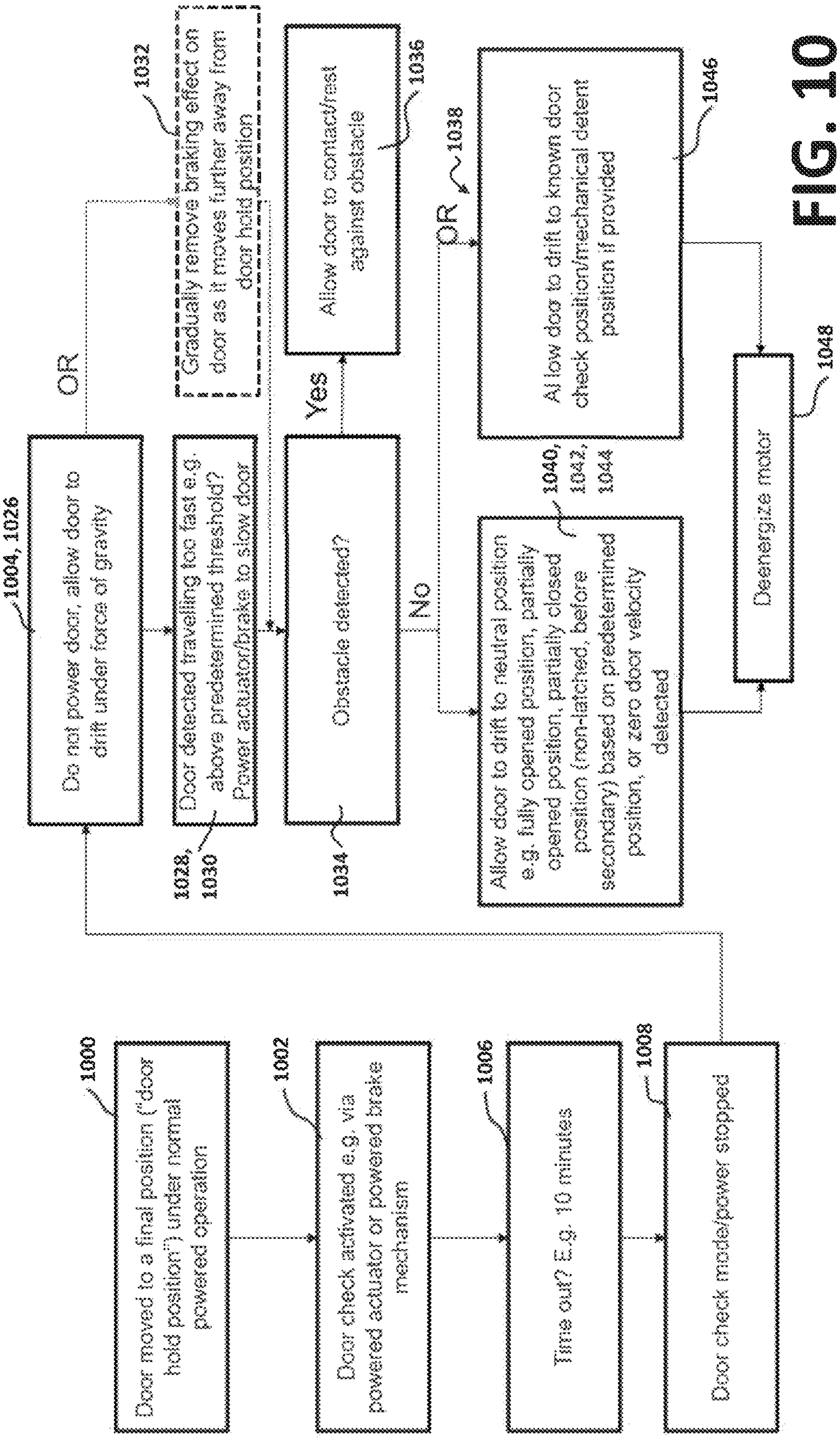
FIG. 10 illustrates steps of the method for controlling motion of the door to the balanced position using non-powered motion according to aspects of the disclosure.

Referring to FIGS. 9 and 10, a method for controlling motion of the door 12 is also provided. As discussed, the door 12 is moveable between the open position and the closed position and has the balanced position 74 whereat the door 12 does not move towards the open position nor the closed position under the effect of gravity.

FIG. 9 illustrates steps of the method for controlling motion of the door 12 to the balanced position 74 using powered motion. The method includes the step of 1000 controlling a power actuator 22 for moving the door 12 to a partially open position between the open position and the closed position in a normal powered operation mode. The method proceeds with the step of 1002 holding the door 12 in the partially open position. The method also includes the step of 1004 allowing the door 12 to move to the balanced position 74 after holding the door 12 in the partially open position. The step of 1004 allowing the door 12 to move to the balanced position 74 can be after an expiry of a predetermined snooze period of time. So, the method also includes the step of 1006 determining whether a predetermined snooze period of time has expired.

The method also includes the step of 1008 entering a door snooze mode in which powered normal operation of power actuator 22 has stopped in response to the expiry of the predetermined snooze period of time. According to an aspect, the step of 1004 allowing the door 12 to move to the balanced position 74 comprises controlling the door 12 at a speed lower than a normal operating speed. So, the method includes the step of 1010 beginning to move the door 12 to the balanced position 74 in a low power reduced speed mode. The method can also include the step of 1012 gradually reducing a braking effect on the door 12 moving away from the partially open position. The method proceeds with the step of 1014 determining whether an obstacle is detected. The next step of the method is 1016 stopping the power actuator 22 and letting the door 12 rest against the obstacle in response to determining the obstacle is detected.

The method also includes the step of 1018 continuing to move the door 12 in response to determining the obstacle is not detected. According to an aspect, the step of 1018 continuing to move the door 12 in response to determining the obstacle is not detected includes 1020 continuing to move the door 12 to the balanced position 74, the balanced position 74 based on one of a predetermined balanced position 80 and a zero velocity of the door 12 being detected. According to another aspect, the step of 1018 continuing to move the door 12 in response to determining the obstacle is not detected includes 1022 continuing to move the door 12 to a predetermined balanced position 80. The method continues with the step of 1024 deenergizing the power actuator 22 in a door sleep mode.

FIG. 10 illustrates steps of the method for controlling motion of the door 12 to the balanced position 74 using non-powered motion. The method includes the step of 1000 controlling a power actuator 22 for moving the door 12 to a partially open position between the open position and the closed position in a normal powered operation mode. The method proceeds with the step of 1002 holding the door 12 in the partially open position. The method also includes the step of 1004 allowing the door 12 to move to the balanced position 74 after holding the door 12 in the partially open position. The step of 1004 allowing the door 12 to move to the balanced position 74 can be after an expiry of a predetermined snooze period of time. So, the method also includes the step of 1006 determining whether a predetermined snooze period of time has expired.

The method also includes the step of 1008 entering a door snooze mode in which powered normal operation of power actuator 22 has stopped in response to the expiry of the predetermined snooze period of time. According to an aspect, the step of 1004 allowing the door 12 to move to the balanced position 74 comprises allowing the door 12 to drift. So, the method includes the step of 1026 beginning to allow the door 12 to drift the balanced position 74 under the effect of gravity while not powering the power actuator 22. The method continues with the steps of 1028 determining whether the door 12 is traveling faster than a predetermined threshold speed 78 and 1030 powering power actuator 22 to slow the door 12 in response to determining the door 12 is traveling faster than the predetermined threshold speed 78. The method can include the step of 1032 gradually reducing a braking effect on the door 12 moving away from the partially open position. The method also includes the step of 1034 determining whether an obstacle is detected. The method proceeds with the step of 1036 stopping the power actuator 22 and letting the door 12 rest against the obstacle in response to determining the obstacle is detected.

The method also includes the step of 1038 continuing to allow the door 12 to drift in response to determining the obstacle is not detected. According to an aspect, the step of

1038 continuing to allow the door 12 to drift in response to determining the obstacle is not detected includes 1040 continuing to allow the door 12 to drift to the balanced position 74, the balanced position 74 based on one of a predetermined balanced position 80 and a zero velocity of the door 12 being detected. In more detail, the method can also include the step of 1042 determining the balanced position 74 during allowing the door 12 to move to the balanced position 74. Specifically, the method can further comprise the step of 1044 determining a speed of the door 12 reaching or approaching zero during the door 12 moving to the balanced position 74. According to another aspect, the step of 1038 continuing to allow the door 12 to drift in response to determining the obstacle is not detected includes the step of 1046 continuing to allow the door 12 to drift to a predetermined balanced position 80. The method also includes the step of 1048 deenergizing the power actuator 22 in a door sleep mode.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented as a collection of instructions executed by a processing device, for example, as a computer program product such as a computer program, program code or computer instructions tangibly embodied in an information carrier, or in a machine-readable storage device, for execution by, or to control the operation of, data processing apparatus such as a programmable processor, a microprocessor, a computer, or multiple computers. The term "controller" as used in this application is comprehensive of any such computer, processor, microchip processor, integrated circuit, or any other element(s), whether singly or in multiple parts, capable of carrying programming for performing the functions, methods and flowcharts provided herein. The controller may be a single such element which is resident on a printed circuit board with the other electronic elements. It may, alternatively, reside remotely from the other elements systems described herein. For example, but without limitation, the at least one controller may take the form of programming in the onboard computer of a vehicle within the door, a latch or at other locations within the vehicle as examples. The controller may also reside in multiple locations or comprise multiple components.

A list of instructions, for example a computer program, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, algorithms, steps, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, microcontroller, or state machine, as examples. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, algorithms, and steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

What is claimed is:

1. A system for controlling motion of a door, the door moveable between an open position and a closed position and having a balanced position whereat the door does not move towards the open position nor the closed position under an effect of gravity, comprising:

a power actuator for moving the door to a partially open position between the open position and the closed position, wherein the power actuator is adapted to allow the door to move to the balanced position after the power actuator has moved the door to the partially open position; and a controller configured to control the power actuator to move the door to the balanced position at an operation rate below a normal rate of operation of the power actuator.

2. The system as set forth in claim 1, wherein the operation rate is allowed to increase as the door moves away from the partially open position.

3. The system as set forth in claim 2, wherein the operation rate is maintained below a predetermined threshold speed as the door approaches the balanced position.

4. The system as set forth in claim 1, wherein the controller is configured to determine the balanced position.

5. The system as set forth in claim 4, wherein the controller is coupled to at least one closure member feedback sensor and is configured to determine when movement of the door is zero or nearly zero using the at least one closure member feedback sensor to determine the balanced position of the door.

6. The system as set forth in claim 1, wherein the power actuator is configured to allow the door to move to the balanced position after an expiry of a predetermined snooze period of time.

7. The system as set forth in claim 1, further comprising a braking circuit configured to short circuit an electric motor of the power actuator to cause a braking effect.

8. A method for controlling motion of a door, the door moveable between an open position and a closed position and having a balanced position whereat the door does not move towards the open position nor the closed position under an effect of gravity, the method comprising the steps of:

controlling a power actuator for moving the door to a partially open position between the open position and the closed position in a normal powered operation mode;

holding the door in the partially open position; and allowing the door to move to the balanced position after holding the door in the partially open position by controlling the power actuator to move the door to the balanced position at an operation rate below a normal rate of operation of the power actuator.

9. The method as set forth in claim 8, wherein the step of allowing the door to move to the balanced position is after expiry of a predetermined snooze period of time.

10. The method as set forth in claim 9, wherein the step of allowing the door to move to the balanced position comprises controlling the door at speed lower than a normal operating speed.

11. The method as set forth in claim 10, further comprising the steps of:

entering a door snooze mode in which powered normal operation of power actuator 22 has stopped in response to expiry of the predetermined snooze period of time;

beginning to move the door to the balanced position in a low power reduced speed mode;

determining whether an obstacle is detected;

stopping the power actuator and letting the door rest against the obstacle in response to determining the obstacle is detected;

continuing to move the door in response to determining the obstacle is not detected; and deenergizing the power actuator in a door sleep mode.

12. The method as set forth in claim 11, wherein the step of continuing to move the door in response to determining the obstacle is not detected includes continuing to move the door to the balanced position, the balanced position based on one of a predetermined balanced position and a zero velocity of the door being detected.

13. The method as set forth in claim 11, wherein the step of continuing to move the door in response to determining the obstacle is not detected includes continuing to move the door to a predetermined balanced position.

14. The method as set forth in claim 11, further including the step of gradually reducing a braking effect on the door moving away from the partially open position.

15. The method as set forth in claim 10, further comprising the steps of:

entering a door snooze mode in which powered normal operation of power actuator has stopped in response to expiry of the predetermined snooze period of time;

beginning to allow the door to drift the balanced position under the effect of gravity while not powering the power actuator;

determining whether the door is traveling faster than a predetermined threshold speed;

powering the power actuator to slow the door in response to determining the door is traveling faster than the predetermined threshold speed;

determining whether an obstacle is detected;

stopping the power actuator and letting the door rest against the obstacle in response to determining the obstacle is detected;

continuing to allow the door to drift in response to determining the obstacle is not detected; and deenergizing the power actuator in a door sleep mode.

16. A power actuator for controlling motion of a door, the door moveable between an open position and a closed position and having a balanced position whereat the door does not move towards the open position nor the closed position under an effect of gravity, the power actuator comprising:

a drive mechanism operatively coupled to one of the door and a vehicle body for imparting a motion of the door;

a geartrain assembly operatively the drive mechanism; and an electric motor operatively coupled to the geartrain assembly, wherein the electric motor is adapted to control the motion of the door in a normal powered operation mode to move the door to stopped position between the open position and the closed position, to control the door in the stopped position in a hold open mode, and to control the motion of the door in a balancing mode to facilitate motion of the door to the balanced position by controlling the power actuator to move the door to the balanced position at an operation rate below a normal rate of operation of the power actuator.

17. The power actuator of claim 16, wherein the electric motor is deactivated during the balancing mode.

18. The power actuator of claim 16, wherein the electric motor is not adapted to respond to an obstacle detection system during the balancing mode.

* * * * *